United States Patent [19]

Tokumitsu

[11] Patent Number: 4,599,702
[45] Date of Patent: Jul. 8, 1986

[54] DIVIDER CIRCUIT FOR DIVIDING N-BIT BINARY DATA USING DECIMAL SHIFTING AND SUMMATION TECHNIQUES

[75] Inventor: Shigenori Tokumitsu, Fukaya, Japan

[73] Assignee: Tokyo Shibaura Denki Kabushiki Kaisha, Kawasaki, Japan

[21] Appl. No.: 525,490

[22] Filed: Aug. 22, 1983

[30] Foreign Application Priority Data

Aug. 27, 1982 [JP] Japan .................. 57-148813

[51] Int. Cl.⁴ .............................. G06F 7/52
[52] U.S. Cl. ................................... 364/764
[58] Field of Search ............................ 364/764

[56] References Cited

U.S. PATENT DOCUMENTS 3,631,230 12/1971 Chen ................. 364/764
4,118,785 10/1978 Izumi et al. ............. 364/764

OTHER PUBLICATIONS

Brady, "Division Using Addition", *IBM Tech. Disclosure Bulletin*, vol. 8, No. 12, May 1966, pp. 1779–1781.
Duke, "Digital Division by Small Integers", *IBM Tech. Disclosure Bulletin*, vol. 14, No. 9, Feb. 1972, pp. 2736–2738.

Primary Examiner—David H. Malzahn
Attorney, Agent, or Firm—Cushman, Darby & Cushman

[57] ABSTRACT

A divider circuit for dividing n-bit binary data $L_n$ by a number m which is defined as $m=2^a-1$ (a is a positive integer of 2 or more), wherein a division operation $L_n/m$ is developed into an infinite series given as:

$$L_n/m = \sum_{b=1}^{\infty} L_{(n-ba)}$$

for $L_{(n-ba)} = L_n/2^{ba}$
(where b is a positive integer).

The divider circuit includes a first circuit responsive to the binary data $L_n$, for sectioning a decimal part of each term of the infinite series in a unit of a-bit from a most significant bit of the decimal part, and for summing corresponding a-bit sectioned portions of decimal parts of all terms of the infinite series to generate summed decimal parts, a second circuit for discriminating a carry to an integer part of the binary data $L_n$ from the summed decimal parts, and a third circuit for adding the carry to a sum of integer parts of the binary data $L_n$ to provide divided data corresponding to $L_n/m$.

8 Claims, 21 Drawing Figures

DIVIDER CIRCUIT FOR DIVIDING N-BIT BINARY DATA USING DECIMAL SHIFTING AND SUMMATION TECHNIQUES

BACKGROUND OF THE INVENTION

The present invention relates to a divider circuit suitable for setting vertical addresses of color data in a system such as a character broadcast system or a caption system.

In a conventional character broadcast or caption system, a display screen is constituted by a dot matrix (248 horizontal pixels×204 vertical pixels). Coloring is, for example, performed in units of sub-blocks each having 8 horizontal pixels and 12 vertical pixels. Therefore, 8-bit X (horizontal) addresses 0 to 247 and 8-bit Y (vertical) addresses 0 to 203 are assigned to the display screen. When coloring is actually performed, quasi columns 0 to 30 along the horizontal direction and quasi rows 0 to 16 along the vertical direction are assigned to the sub-blocks. Each quasi column corresponds to eight horizontal pixels, and each quasi row corresponds to 12 vertical pixels. A dot pattern is read out from an image memory in units of eight horizontal pixels. Therefore, the dot pattern is designated in units of quasi columns 0 to 30 and Y addresses 0 to 203. Coloring is performed in units of sub-blocks, as described above, so that color data can be read out in units of quasi columns 0 to 30 along the horizontal direction but must be read out in units of 12-bit quasi rows along the vertical direction. Therefore, in order to prepare a Y address of color data, a quasi row converter is required wherein vertical addresses 0 to 203 having the dot pattern data are divided into units of 12 pixels and are converted to quasi rows 0 to 16.

The conventional sub-block as the unit of coloring comprises eight horizontal pixels and 12 vertical pixels. However, a minimization of a sub-block unit provides good coloring of display. From this, the preferred sub-block unit is expected to be smaller than that of the conventional sub-block. In this case, the Y addresses along the vertical direction of the screen must be quasi row-converted. If the quasi rows are arranged in units of two lines, four lines, or eight lines, and hence in units of $2^n$ ($n=1, 2, 3, \ldots$), seven, six or five most significant bits of the 8-bit Y address can be easily quasi row-converted. However, if the quasi row is employed in units of three lines, six lines, nine lines, ..., and hence in units of $3^n$ ($n=1, 2, 3, \ldots$), the Y addresses must be quasi row-converted in units of three lines. With a combination of quasi row conversion in units of three lines and of two lines, all possible quasi row conversions such as two-, three-, four-, six-, eight-, nine- and 12-line quasi row conversions can be performed. In this case, two-line quasi row conversion can be easily performed by shifting each bit of the Y address. Therefore, it is important to consider the circuit configuration of a quasi row converter for performing quasi row conversion in units of three lines.

Table 1 below shows 8-bit Y addresses and their updated addresses obtained by quasi row-converting the 8-bit addresses in units of three lines. A quasi row converter for performing quasi row conversion in units of three lines will be described with reference to Table 1.

TABLE 1

| Y address | | | | | | | | | Quasi row-converted address | | | | | | | |
|---|---|---|---|---|---|---|---|---|---|---|---|---|---|---|---|---|
| Decimal notation | $a_7$ | $a_6$ | $a_5$ | $a_4$ | $a_3$ | $a_2$ | $a_1$ | $a_0$ | Decimal notation | $b_6$ | $b_5$ | $b_4$ | $b_3$ | $b_2$ | $b_1$ | $b_0$ |
| 0 | 0 | 0 | 0 | 0 | 0 | 0 | 0 | 0 | | | | | | | | |
| 1 | 0 | 0 | 0 | 0 | 0 | 0 | 0 | 1 | 0 | 0 | 0 | 0 | 0 | 0 | 0 | 0 |
| 2 | 0 | 0 | 0 | 0 | 0 | 0 | 1 | 0 | | | | | | | | |
| 3 | 0 | 0 | 0 | 0 | 0 | 0 | 1 | 1 | | | | | | | | |
| 4 | 0 | 0 | 0 | 0 | 0 | 1 | 0 | 0 | 1 | 0 | 0 | 0 | 0 | 0 | 0 | 1 |
| 5 | 0 | 0 | 0 | 0 | 0 | 1 | 0 | 1 | | | | | | | | |
| 6 | 0 | 0 | 0 | 0 | 0 | 1 | 1 | 0 | | | | | | | | |
| 7 | 0 | 0 | 0 | 0 | 0 | 1 | 1 | 1 | 2 | 0 | 0 | 0 | 0 | 0 | 1 | 0 |
| 8 | 0 | 0 | 0 | 0 | 1 | 0 | 0 | 0 | | | | | | | | |
| 9 | 0 | 0 | 0 | 0 | 1 | 0 | 0 | 1 | | | | | | | | |
| 10 | 0 | 0 | 0 | 0 | 1 | 0 | 1 | 0 | 3 | 0 | 0 | 0 | 0 | 0 | 1 | 1 |
| 11 | 0 | 0 | 0 | 0 | 1 | 0 | 1 | 1 | | | | | | | | |
| 12 | 0 | 0 | 0 | 0 | 1 | 1 | 0 | 0 | | | | | | | | |
| 13 | 0 | 0 | 0 | 0 | 1 | 1 | 0 | 1 | 4 | 0 | 0 | 0 | 0 | 1 | 0 | 0 |
| 14 | 0 | 0 | 0 | 0 | 1 | 1 | 1 | 0 | | | | | | | | |
| 15 | 0 | 0 | 0 | 0 | 1 | 1 | 1 | 1 | | | | | | | | |
| 16 | 0 | 0 | 0 | 1 | 0 | 0 | 0 | 0 | 5 | 0 | 0 | 0 | 0 | 1 | 0 | 1 |
| 17 | 0 | 0 | 0 | 1 | 0 | 0 | 0 | 1 | | | | | | | | |
| 18 | 0 | 0 | 0 | 1 | 0 | 0 | 1 | 0 | | | | | | | | |
| 19 | 0 | 0 | 0 | 1 | 0 | 0 | 1 | 1 | 6 | 0 | 0 | 0 | 0 | 1 | 1 | 0 |
| 20 | 0 | 0 | 0 | 1 | 0 | 1 | 0 | 0 | | | | | | | | |
| 21 | 0 | 0 | 0 | 1 | 0 | 1 | 0 | 1 | | | | | | | | |
| 22 | 0 | 0 | 0 | 1 | 0 | 1 | 1 | 0 | 7 | 0 | 0 | 0 | 0 | 1 | 1 | 1 |
| 23 | 0 | 0 | 0 | 1 | 0 | 1 | 1 | 1 | | | | | | | | |
| 24 | 0 | 0 | 0 | 1 | 1 | 0 | 0 | 0 | | | | | | | | |
| 25 | 0 | 0 | 0 | 1 | 1 | 0 | 0 | 1 | 8 | 0 | 0 | 0 | 1 | 0 | 0 | 0 |
| 26 | 0 | 0 | 0 | 1 | 1 | 0 | 1 | 0 | | | | | | | | |
| 27 | 0 | 0 | 0 | 1 | 1 | 0 | 1 | 1 | | | | | | | | |
| 28 | 0 | 0 | 0 | 1 | 1 | 1 | 0 | 0 | 9 | 0 | 0 | 0 | 1 | 0 | 0 | 1 |
| 29 | 0 | 0 | 0 | 1 | 1 | 1 | 0 | 1 | | | | | | | | |
| 246 | 1 | 1 | 1 | 1 | 0 | 1 | 1 | 0 | | | | | | | | |
| 247 | 1 | 1 | 1 | 1 | 0 | 1 | 1 | 1 | 82 | 1 | 0 | 1 | 0 | 0 | 1 | 0 |
| 248 | 1 | 1 | 1 | 1 | 1 | 0 | 0 | 0 | | | | | | | | |
| 249 | 1 | 1 | 1 | 1 | 1 | 0 | 0 | 1 | | | | | | | | |
| 250 | 1 | 1 | 1 | 1 | 1 | 0 | 1 | 0 | 83 | 1 | 0 | 1 | 0 | 0 | 1 | 1 |
| 251 | 1 | 1 | 1 | 1 | 1 | 0 | 1 | 1 | | | | | | | | |
| 252 | 1 | 1 | 1 | 1 | 1 | 1 | 0 | 0 | | | | | | | | |

TABLE 1-continued

| Y address | | | | | | | | Quasi row-converted address | | | | | | | |
|---|---|---|---|---|---|---|---|---|---|---|---|---|---|---|---|
| Decimal notation | $a_7$ | $a_6$ | $a_5$ | $a_4$ | $a_3$ | $a_2$ | $a_1$ | $a_0$ | Decimal notation | $b_6$ | $b_5$ | $b_4$ | $b_3$ | $b_2$ | $b_1$ | $b_0$ |
| 253 | 1 | 1 | 1 | 1 | 1 | 1 | 0 | 1 | 84 | 1 | 0 | 1 | 0 | 1 | 0 | 0 |
| 254 | 1 | 1 | 1 | 1 | 1 | 1 | 1 | 0 | | | | | | | | |
| 255 | 1 | 1 | 1 | 1 | 1 | 1 | 1 | 1 | 85 | 1 | 0 | 1 | 0 | 1 | 0 | 1 |

A three-line quasi row conversion can be exemplified using a read-only memory (ROM). An 8-bit Y address is regarded as a ROM address, and a quasi row-converted address of data is written in the ROM. More particularly, 7-bit addresses $b_6b_5b_4b_3b_2b_1b_0$ obtained by quasi row conversion as data corresponding to addresses 0 to 255, each of which consists of 8-bit data $a_7a_6a_5a_4a_3a_2a_1a_0$, are written in the ROM.

However, in order to form an integrated system including a quasi row converter, the quasi row converter having the ROM requires 1792 (=256×7) memory cells and a corresponding Y address decoder. Therefore, the above quasi row converter requires a large amount of hardware and is not suitable for an IC.

Another exemplification of quasi row conversion in units of three lines is a logic converter for performing the conversion shown in Table 1. Bits $b_0$ to $b_7$ of the quasi row-converted address can be designated by logic expressions using bits $a_0$ to $a_7$ of the Y address as follows:

$b_6 = a_7a_6$ $b_5 = \bar{a}_7a_6a_5 + a_7\bar{a}_6$ $b_4 = \bar{a}_7a_6\bar{a}_5 + a_7\bar{a}_6a_5 + a_7a_5a_4 + a_7\bar{a}_6a_4 + \bar{a}_6a_5a_4$ $b_3 = \bar{a}_7\bar{a}_5a_4a_3 + \bar{a}_7\bar{a}_6a_5\bar{a}_4 + \bar{a}_7a_6\bar{a}_5a_3 + \bar{a}_7a_6\bar{a}_5a_4 +$ $\bar{a}_7a_6a_4a_3 + a_7\bar{a}_6\bar{a}_5\bar{a}_4 + a_7\bar{a}_6a_5a_3 + a_7\bar{a}_6a_5a_4 +$ $a_6\bar{a}_5a_4a_3 + a_7a_6a_5\bar{a}_4$ $b_2 = \bar{a}_7\bar{a}_6\bar{a}_4a_3a_2 + \bar{a}_7\bar{a}_6\bar{a}_5a_4\bar{a}_3 + \bar{a}_7a_6a_5\bar{a}_4a_2 +$ $\bar{a}_7\bar{a}_6a_5\bar{a}_4a_3 + \bar{a}_6a_5a_4a_3a_2 + \bar{a}_7\bar{a}_6\bar{a}_5\bar{a}_4\bar{a}_3 +$ $\bar{a}_7a_6\bar{a}_5a_4a_3 + \bar{a}_7a_6\bar{a}_5a_4a_2 + a_6a_5\bar{a}_4a_3a_2 +$ $\bar{a}_7a_6a_5a_4\bar{a}_3 + a_7\bar{a}_6\bar{a}_5\bar{a}_4a_2 + a_7\bar{a}_6\bar{a}_5\bar{a}_4a_3 +$ $a_7\bar{a}_6a_4a_3a_2 + a_7\bar{a}_6a_5\bar{a}_4\bar{a}_3 + a_7\bar{a}_6a_5a_4a_2 +$ $a_7\bar{a}_6a_5a_4a_3 + a_7a_6\bar{a}_4a_3a_2 + a_7a_6a_5a_4\bar{a}_3 +$ $a_7a_6a_5\bar{a}_4a_2 + a_7a_6a_5\bar{a}_4a_3 + a_7a_6a_5a_3a_2$ The logic expressions for bits $b_1$ and $b_0$ are omitted since they are too long. As will be apparent from the above description, when the quasi row converter for performing quasi row conversion in units of three lines comprises a logic circuit, the amount of hardware is greatly increased as in the case of the quasi row converter using ROM. These conventional quasi row converters are not suitable for an IC.

SUMMARY OF THE INVENTION

The present invention has been made in consideration of the above situation and has for its object to provide a divider circuit which can be constructed using a small amount of hardware, to quasi row-convert vertical addresses of a display screen in a system such as a character broadcast system and a caption system.

According to the present invention, a division operation $L_n/m$ is developed into the following infinite series in order to divide an n-bit binary number $L_n$ by m (for $m = 2^a - 1$ where a is a positive integer of 2 or more):

$$L_n/m = \sum_{b=1}^{\infty} L_{(n-ba)}$$

for $L_{(n-ba)} = L_n/2^{ba}$ (where b is a positive integer)

Decimal parts of all the terms of this infinite series are summed and are rounded to give a carry to an integer part. The rounded value or carry is added to the sum of the integer parts of the infinite series.

According to the present invention, there is provided a divider circuit having only a small amount of hardware for quasi row conversion of the vertical addresses of a display screen.

BRIEF DESCRIPTION OF THE DRAWINGS

FIG. 1 is a diagram for explaining designation of addresses in a character broadcast system or the like;

DETAILED DESCRIPTION OF THE PREFERRED EMBODIMENTS

Figure 1:
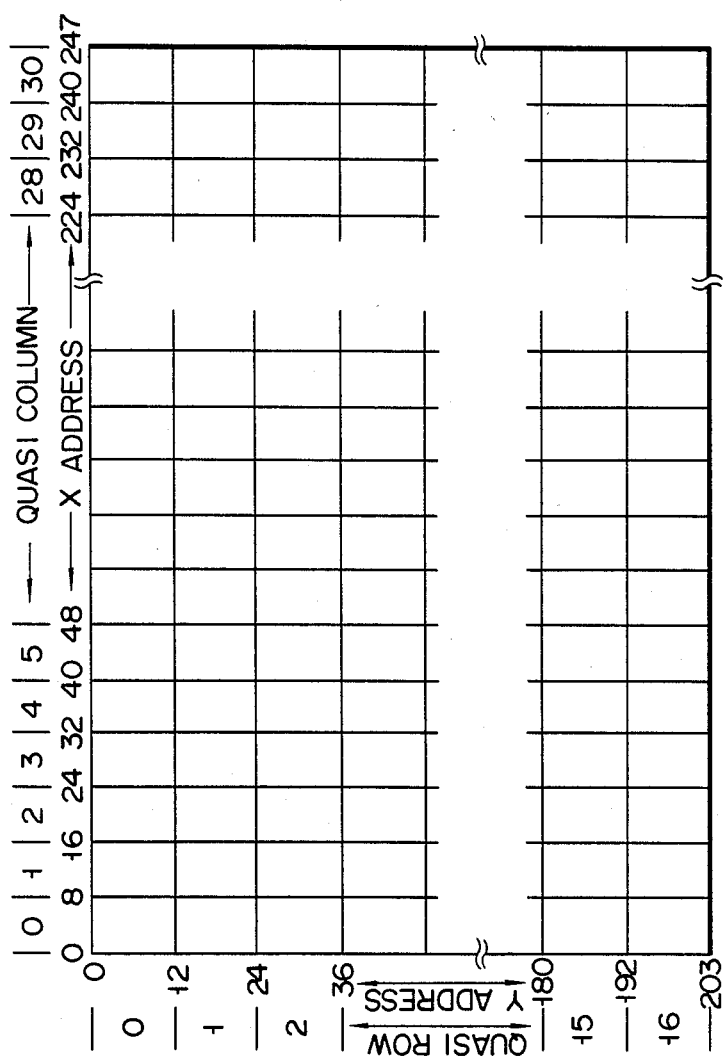

Preferred embodiments of the present invention will be described with reference to the accompanying drawings.

For illustrative convenience, a dividend is given as an 8-bit binary number $L_n$ (=$L_8$), and a divisor is given as $m = 3$ (=$2^a - 1 = 2^2 - 1$). Assume that $L_n/m$ is given as $L_8/3$. Also assume that an 8-bit Y address $L_8$ is given as follows:

$L_8 = a_7a_6a_5a_4a_3a_2a_1a_0$ where $a_0$ to $a_7$ are bits of binary Y address $L_8$ and are designated by logic "0" or "1". Bit $a_0$ is the least significant bit, and bit $a_7$ is the most significant bit.

In order to quasi row-convert the Y address $L_8$ in units of three lines, Y address $L_8$ is divided by three to obtain a quotient. The quotient $L_8/3$ is given as follows:

$$L_8/3 = (L_8/4) \times (4/3) \quad (1)$$
$$= (L_8/4) \times (1 + 1/3)$$
$$= L_8/4 + (1/3) \times (L_8/4)$$

The term $L_8/4$ indicates that a decimal point of Y address $a_7a_6a_5a_4a_3a_2a_1a_0$ is shifted by two digit positions to the left (upper bits). An updated address is thus designated as $a_7a_6a_5a_4a_3a_2.a_1a_0$. Therefore, the term $L_8/4$ has an integer part of six digit positions. When this integer part is expressed as $L_6$, equation (1) is expressed as follows:

$$L_8 3 = L_6 + L_6/3 \quad (2)$$

The same operation as for the term $L_8/3$ is performed for the term $L_6/3$, and the following result is obtained:

$$L_8/3 = L_6 + L_6/3 \quad (3)$$
$$= L_6 + L_4 + L_4/3$$

The above operation is repeated to obtain the following equation:

$$L_8/3 = L_6 + L_6/3 \quad (4)$$
$$= L_6 + L_4 + L_4/3$$
$$= L_6 + L_4 + L_2 + L_2/3$$
$$= L_6 + L_4 + L_2 + L_0 + L_0/3$$
$$= L_6 + L_4 + L_2 + L_0 + \ldots$$

The term $L_8/3$ can thus be developed into the infinite series $L_6+L_4+L_2+L_0+\ldots$. The terms $L_6$, $L_4$, $L_2$, $L_0$, ... are obtained by shifting the decimal point of binary Y address $L_8$ $(=a_7a_6a_5a_4a_3a_2a_1a_0)$ in units of two digit positions to the left. More particularly, these terms are expressed as follows:

$$L_6 = a_7a_6a_5a_4a_3a_2 \cdot a_1a_0$$
$$L_4 = a_7a_6a_5a_4 \cdot a_3a_2a_1a_0$$
$$L_2 = a_7a_6 \cdot a_5a_4a_3a_2a_1a_0$$
$$L_0 = 0 \cdot a_7a_6a_5a_4a_3a_2a_1a_0$$

The term $L_8/3$ obtained by quasi row-converting Y address $L_8$ can be calculated as a sum of the following infinite series:

|←——integer part——→|←——decimal part——→|

$L_6$: $a_7$ $a_6$ $a_5$ $a_4$ $a_3$ $a_2$ . $a_1$ $a_0$ 0 0 0 0 0 0 ...
$L_4$: 0 0 $a_7$ $a_6$ $a_5$ $a_4$ $a_3$ $a_2$ . $a_3$ $a_2$ $a_1$ $a_0$ 0 0 0 0 ...
$L_2$: 0 0 0 0 $a_7$ $a_6$ . $a_5$ $a_4$ $a_3$ $a_2$ $a_1$ $a_0$ 0 0 ...
$L_0$: 0 0 0 0 0 0 . $a_7$ $a_6$ $a_5$ $a_4$ $a_3$ $a_2$ $a_1$ $a_0$ ...
     : 0 0 0 0 0 0 . 0 0 $a_7$ $a_6$ $a_5$ $a_4$ $a_3$ $a_2$ ...
                           0 0 $a_7$ $a_6$ $a_5$ $a_4$ ...

+)_____

When the sum of this infinite series is calculated, the number to the right of the decimal point can be asymptotically obtained from the total of asymptotic terms, each of which term is obtained by adding four prescribed 2-bit items of data by four times as:

$a_1a_0$
$a_3a_2$
$a_5a_4$
+) $a_7a_6$
────────
$X_3X_2X_1X_0$

When the sum is given as $X_3X_2X_1X_0$, the carry value of each asymptotic term to be added to the integer part can be determined from the value of $X_3XHD\ 2X_1X_0$. As a result, a carry to the integer part is determined. Bits $a_0$, $a_1$, $a_2$, $a_3$, $a_4$, $a_5$, $a_6$ and $a_7$ are designated by logic "1" or "0". However, 13 types of sum results $X_3X_2X_1X_0$ may be obtained as combinations of sums of the four 2-bit data for each asymptotic term, as shown in Table 2. For example, when all bits $a_0$ to $a_7$ are set at logic "0", $X_3X_2X_1X_0$ is set at "0000". However, when all bits $a_0$ to $a_7$ are set at logic "1", $X_3X_2X_1X_0$ is set at "1100".

TABLE 2

| $X_3$ | $X_2$ | $X_1$ | $X_0$ |
|---|---|---|---|
| 0 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |

Carry $Y_2Y_1Y_0$ to the integer part is obtained in accordance with 13 types of logic combinations.

(1) For $X_3X_2X_1X_0 = 0000$
  00.00
  .0000
  . 0000
  .
  .
  +)_____
  00.000000 ...
Therefore, $Y_2Y_1Y_0 = 000$
(2) For $X_3X_2X_1X_0 = 0001$
  00.01
  .0001
  . 0001
  .
  .
  +)_____
  00.010101 ...
Therefore, $Y_2Y_1Y_0 = 000$
(3) For $X_3X_2X_1X_0 = 0010$
  00.10
  .0010
  . 0010
  .
  .
  +)_____
  00.101010 ...
Therefore, $Y_2Y_1Y_0 = 000$
(4) For $X_3X_2X_1X_0 = 0011$
  00.11
  .0011
  . 0011
  .
  .
  +)_____
  00.111111 ...
Since $0.111111\ldots = 1.0$, $Y_2Y_1Y_0 = 001$.
(5) For $X_3X_2X_1X_0 = 0100$
  01.00
  .0100
  . 0100

-continued $$+) \underline{\phantom{0}.\phantom{000000}}$$
$$01.010100\ldots$$
Therefore, $Y_2Y_1Y_0 = 001$ In the same manner as described above, the remaining values of carry $Y_2Y_1Y_0$ are sequentially obtained from $X_3X_2X_1X_0$, and the results are shown in Table 3.

TABLE 3

| $X_3$ | $X_2$ | $X_1$ | $X_0$ | $Y_2$ | $Y_1$ | $Y_0$ |
|---|---|---|---|---|---|---|
| 0 | 0 | 0 | 0 | 0 | 0 | 0 |
| 0 | 0 | 0 | 1 | | | |
| 0 | 0 | 1 | 0 | | | |
| 0 | 0 | 1 | 1 | 0 | 0 | 1 |
| 0 | 1 | 0 | 0 | | | |
| 0 | 1 | 0 | 1 | | | |
| 0 | 1 | 1 | 0 | 0 | 1 | 0 |
| 0 | 1 | 1 | 1 | | | |
| 1 | 0 | 0 | 0 | | | |
| 1 | 0 | 0 | 1 | 0 | 1 | 1 |
| 1 | 0 | 1 | 0 | | | |
| 1 | 0 | 1 | 1 | | | |
| 1 | 1 | 0 | 0 | 1 | 0 | 0 |

In this case, note that $0.111111\ldots = 1.0$. When carry $Y_2Y_1Y_0$, which is the carry value from the decimal part, to the integer part is obtained, the integer parts of the terms of the series are summed and the carry is added to the resultant sum to obtain $L_8/3$ which corresponds to the value obtained by quasi row-converting the Y address $L_8$.

Figure 2:
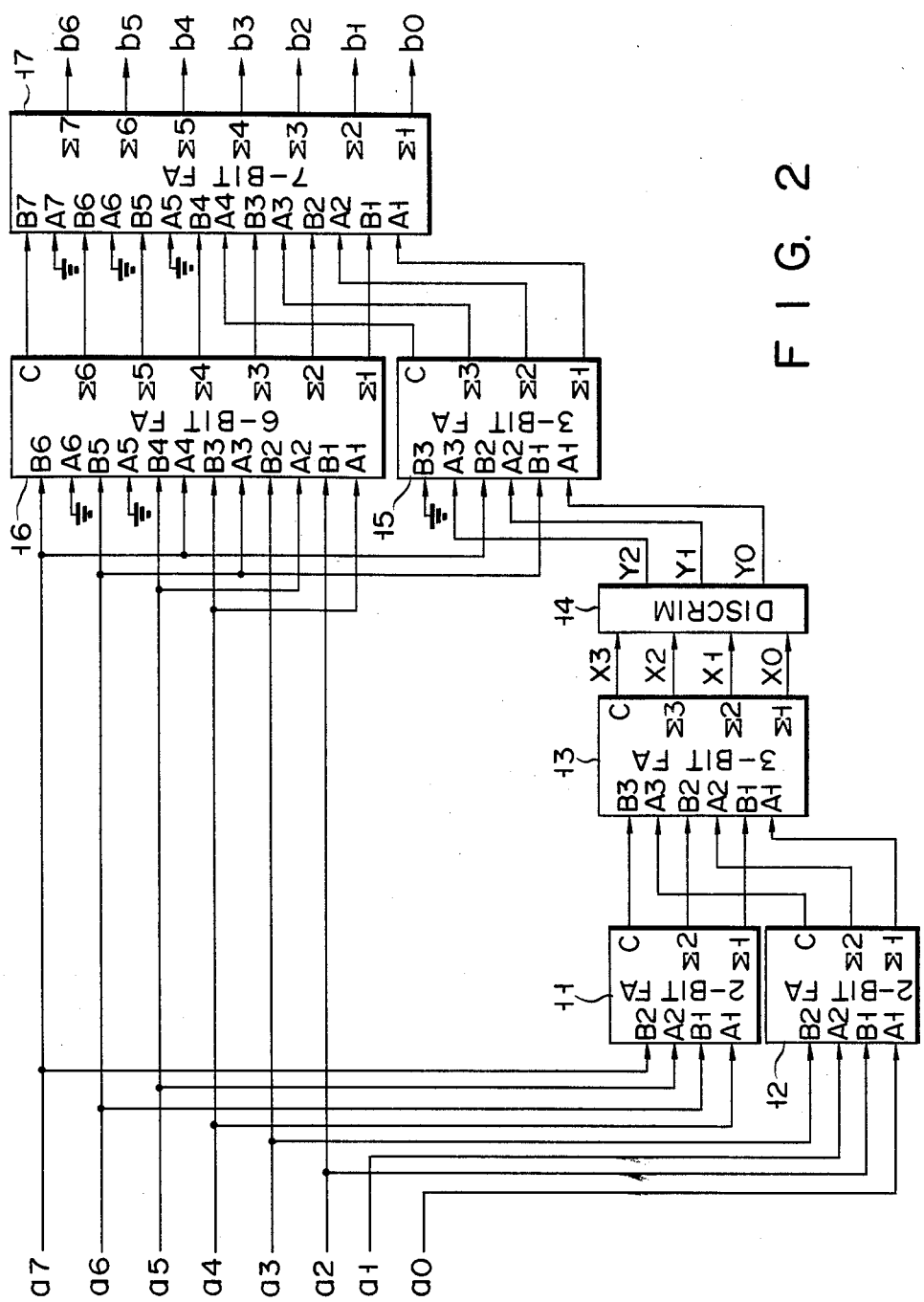
FIG. 2 is a block diagram of a divider circuit according to a first embodiment of the present invention.

The present invention is based upon the above principle. The configuration of the divider circuit will be described hereinafter with reference to FIG. 2. Reference numerals 11 and 12 denote 2-bit full adders, respectively; B 13 and 15, 3-bit full adders, respectively; 16, a 6-bit full adder; 17, a 7-bit full adder; and 14, a discriminator for discriminating a carry from a decimal part to an integer part.

The operation of the divider circuit will be described hereinafter. Full adders 11, 12 and 13 perform additions of decimal parts as follows:

$$\begin{array}{r} a_1a_0 \\ a_3a_2 \\ a_5a_4 \\ +)\underline{\phantom{00}a_7a_6\phantom{00}} \\ X_3X_2X_1X_0 \end{array}$$

More particularly, 2-bit data $a_7a_6$ is added to 2-bit data $a_5a_4$ by full adder 11. Two-bit data $a_3a_2$ is added to 2-bit data $a_1a_0$ by full adder 12. Sum data from full adders 11 and 12 are added by full adder 13, thereby obtaining the sum $X_3X_2X_1X_0$ of the decimal parts. Carry $Y_2Y_1Y_0$ to the integer part is obtained by discriminator 14. Discriminator 14 performs a carry discrimination in accordance with the following logic expressions:

$$Y_2 = X_3 \cdot X_2$$

$$Y_1 = X_3 \cdot \overline{X}_2 + X_2 \cdot X_1$$

$$Y_0 = X_3 \cdot \overline{X}_2 \cdot X_1 + \overline{X}_3 \cdot X_2 \cdot \overline{X}_1 + \overline{X}_2 \cdot X_1 \cdot X_0 + X_3 \cdot \overline{X}_2 \cdot X_0$$

Figure 3:
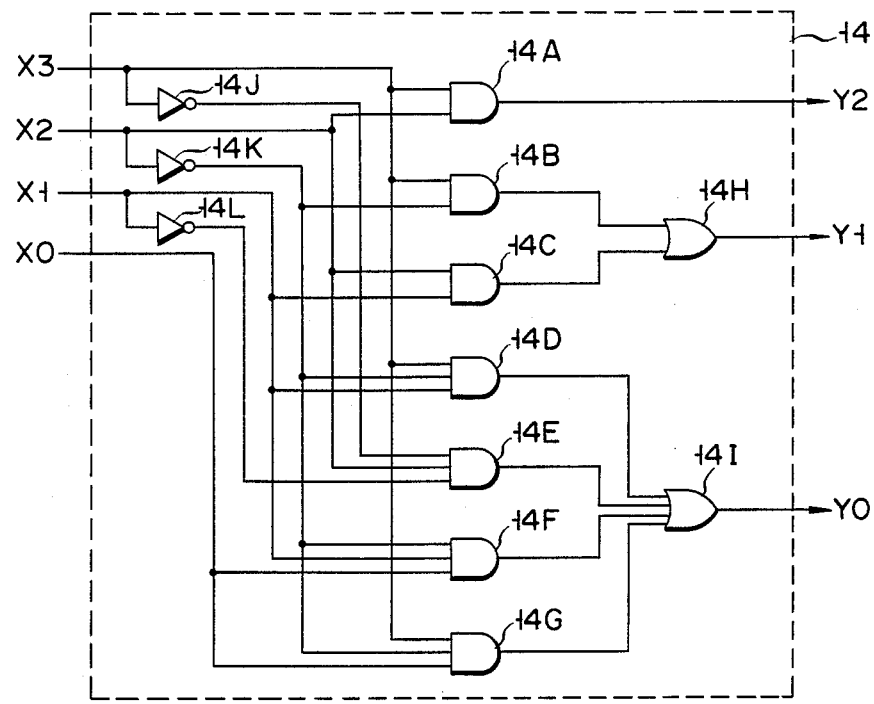
FIG. 3 is a circuit diagram of a discriminator 14 shown in FIG. 2.

Discriminator 14 for satisfying the above logic expressions may comprise seven AND gates 14A to 14G, two OR gates 14H and 14I, and three inverters 14J to 14L, as shown in FIG. 3. Data $X_3$ is supplied to AND gates 14A, 14B, 14D and 14G. Data $X_2$ is supplied to AND gates 14A, 14C and 14E. Data $X_1$ is supplied to AND gates 14C, 14D and 14F. Data $X_0$ is supplied to AND gates 14F and 14G. Data $X_3$ is supplied via an inverter 14J to AND gate 14E; data $X_2$, via an inverter 14K to AND gates 14B, 14D, 14F and 14G; and data $X_1$, via an inverter 14L to AND gate 14E. An ANDed output from gate 14A is used as said carry $Y_2$. ANDed outputs from gates 14B and 14C are converted to said carry $Y_1$ via an OR gate 14H. ANDed outputs from gates 14D to 14G are converted to said carry $Y_0$ via an OR gate 14I.

Figure 3A:
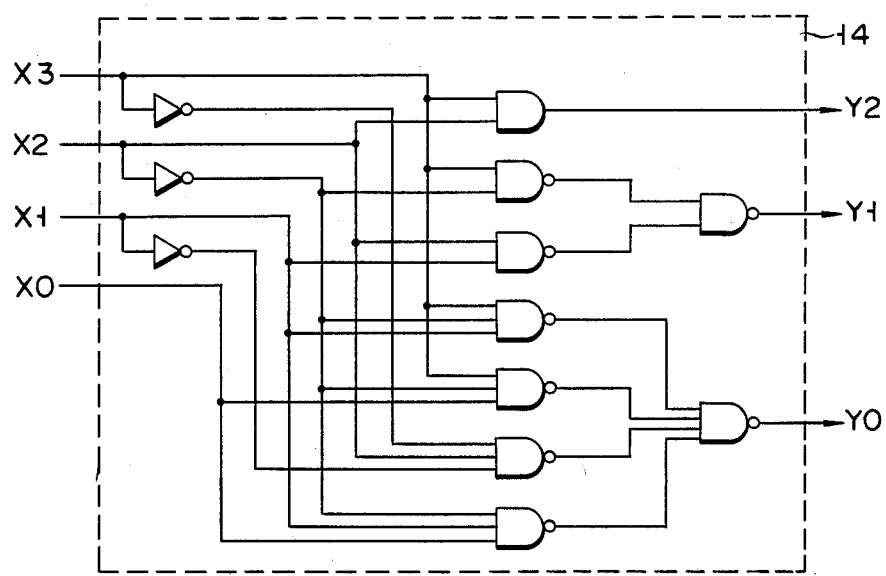
FIG. 3A is a modification of the circuit shown in FIG. 3.

Carry $Y_2$ to $Y_0$ obtained from discriminator 14 and integer data $a_7$ to $a_2$ are supplied to full adders 15 to 17. Full adders 15 to 17 perform a carry operation and addition of integer data. More specifically, carry $Y_2Y_1Y_0$ to the integer digit position is added to the integer part of address $L_2$ by full adder 15. The integer part of address $L_6$ is added to that of address $L_4$ by full adder 16. Sum data from full adders 15 and 16 are added by full adder 17. Full adder 17 thus produces 7-bit data $b_6b_5b_4b_3b_2b_1b_0$ (i.e., data obtained by quasi row-converting an 8-bit Y address). Discriminator 14 may have another configuration, e.g., as shown in FIG. 3A.

According to this embodiment, three-line quasi row conversion can be performed by six full adders 11 to 13 and 15 to 17 and discriminator 14 for discriminating the carry to the integer digit position. Therefore, the quasi row converter according to the present invention requires only a small amount of hardware and can be easily integrated as an IC unlike the conventional quasi row converter.

Figure 4:
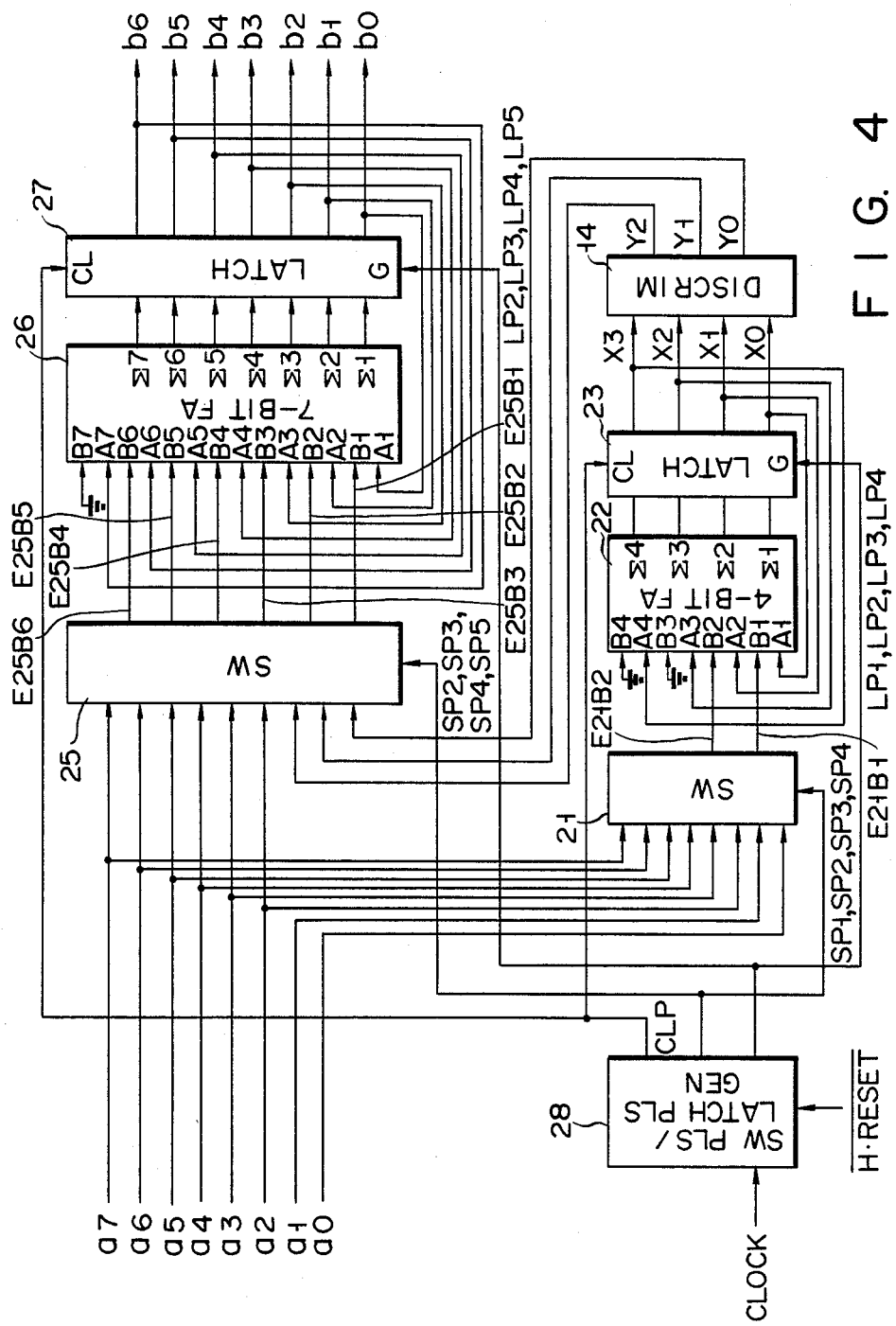
FIG. 4 is a block diagram of a divider circuit according to a second embodiment of the present invention.

FIG. 4 is a block diagram of a divider circuit according to the second embodiment of the present invention. Reference numerals 21 and 25 denote switch circuits for switching given data supplied to adders, respectively; 22, a 4-bit full adder for adding the decimal parts, 26, a 7-bit full adder for adding integer parts and a carry to the integer part; 23 and 27, latches for latching sum data, respectively; 14, a discriminator for discriminating the carry to the integer digit position; and 28, a pulse generator for supplying switching pulses SP1 to SP5 to switch circuits 21 and 25 and latch pulses LP1 to LP5 to latches 23 and 27.

The decimal parts are added by means of switch circuit 21, 4-bit full adder 22, and latch 23. Four 2-bit data element $a_1a_0$, $a_3a_2$, $a_5a_4$ and $a_7a_6$ are sequentially switched by switch circuit 21 to thereby supply them as signals E21B1 and E21B2 to full adder 22. For this purpose, pulses SP1, SP2, SP3 and SP4 are used as the switching pulses. The resultant sum data are sequentially latched by latch 23 in response to latch pulses LP1, LP2, LP3 and LP4, respectively. The sum results latched in response to latch pulse LP4 are supplied as sum $X_3X_2X_1X_0$ of four 2-bit data $a_1a_0$, $a_3a_2$, $a_5a_4$ and $a_7a_6$ to discriminator 14. Discriminator 14 has substantially the same configuration as that in FIG. 2 and produces carry $Y_2Y_1Y_0$ to an integer digit position.

Meanwhile, the integer parts of the terms of the series are added by means of switch circuit 25, 7-bit full adder 26 and latch 27. The integer digit positions of $L_6$ which are indicated by bits $a_7$, $a_6$, $a_5$, $a_4$, $a_3$ and $a_2$, the integer digit positions of $L_4$ which are indicated by bits $a_7$, $a_6$, $a_5$, and $a_4$, and the integer digit positions of $L_2$ which are indicated by bits $a_7$ and $a_6$ are switched by switch circuit 25 and are sequentially supplied as signals E25B1 to E25B6 to full adder 26 in response to switching pulses SP2, SP3 and SP4. The sum results of the integer parts are sequentially latched by latch 27. Carry $Y_2Y_1Y_0$ to an integer digit position is supplied via switch circuit 25 to full adder 26 in response to switching pulse SP5. The preceding latched data is then added by full adder 26 to the carry from switch circuit 25. Total sum data is latched in response to latch pulse LP5, so that 7-bit data $b_6b_5b_4b_3b_2b_1b_0$ obtained by quasi row-converting Y address $L_8$ in units of three lines is latched.

Figure 5:
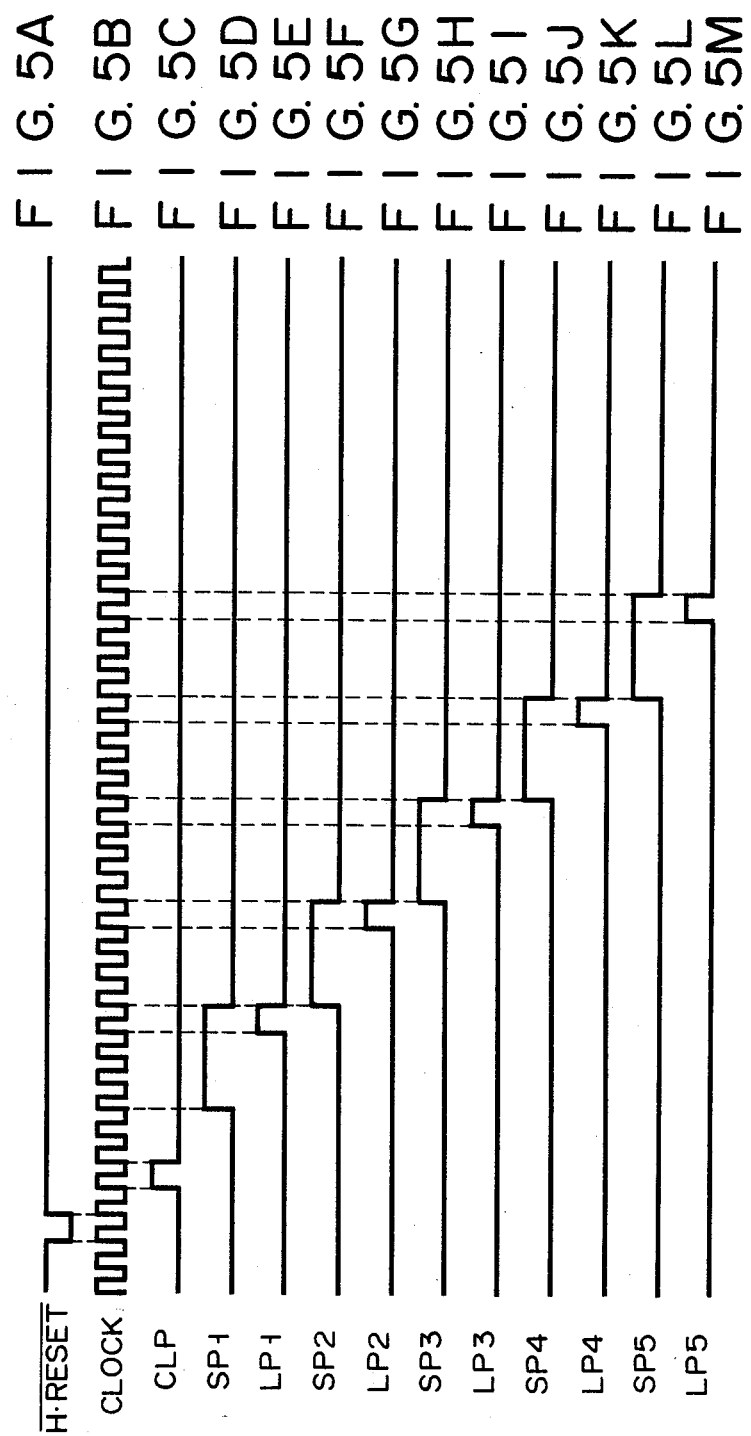
FIGS. 5A to 5M are timing charts of switching and latch pulses generated by a pulse generator 28 shown in FIG. 4.
Figure 6:
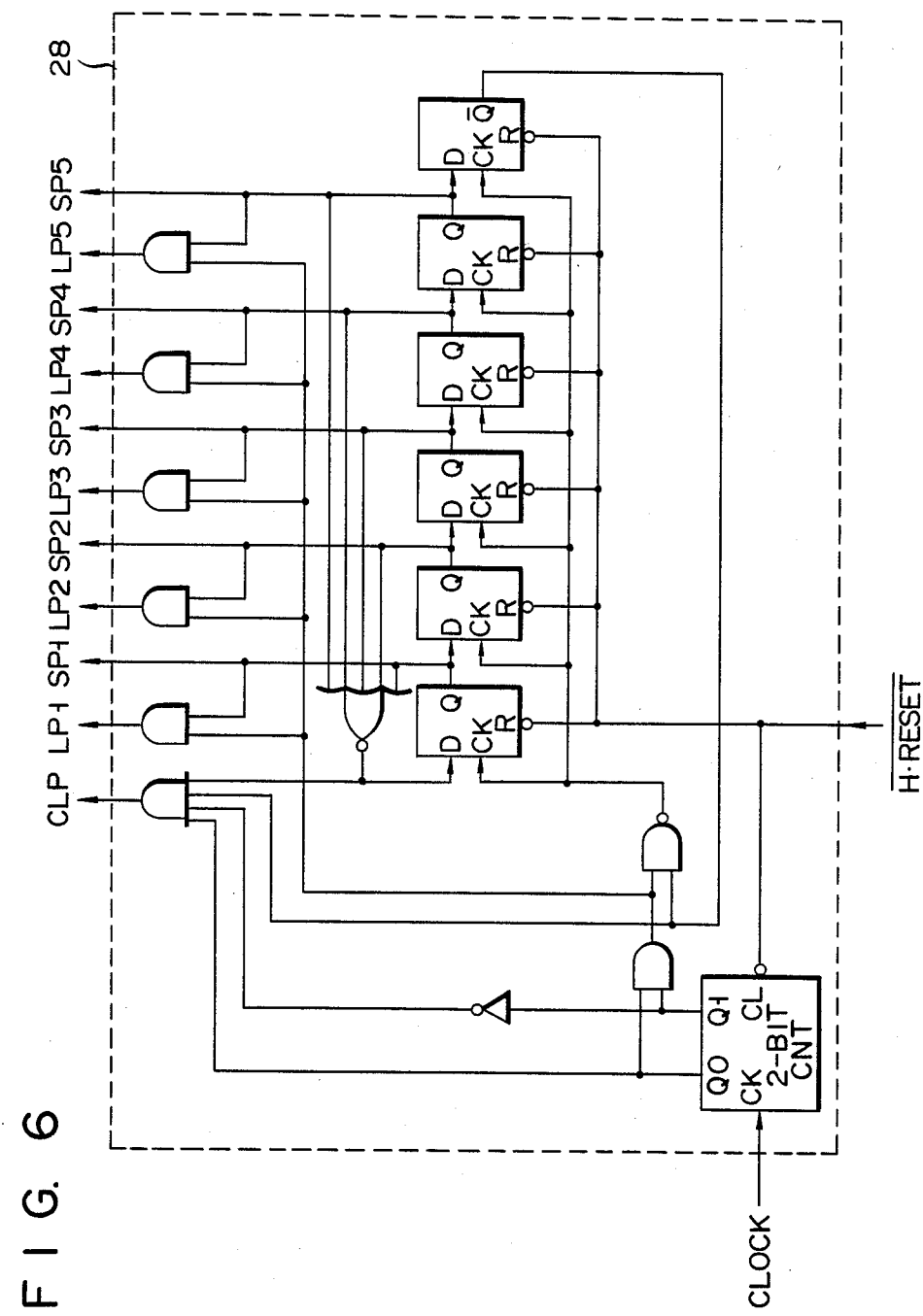
FIG. 6 is a circuit diagram of the pulse generator 28 shown in FIG. 4.

FIGS. 5A to 5M are timing charts illustrating pulses applied to or generated from pulse generator 28. FIG. 6 shows a circuit configuration of generator 28. D type flip-flops (D-FF) 28A to 28F are reset and a 2-bit counter 28H is cleared by a reset pulse $\overline{\text{H.RESET}}$ (FIG. 5A). A clock is supplied to the clock (CK) input of counter 28H (FIG. 5B). In NTSC system, the period of pulse $\overline{\text{H.RESET}}$ is 63.5 μs (one horizontal period) and the frequency of clock is 5.73 MHz (8/5 $f_{sc}$ where $f_{sc}$ denotes the color subcarrier frequency. A $Q_0$ output from counter 28H is supplied to AND gates 28I and 28L. A $Q_1$ output from counter 28H is supplied to AND gate 28I and supplied via an inverter 28K to AND gate 28L. An ANDed output from gate 28I is supplied to an NAND gate 28J as well as to AND gates 28M to 28R. Gate 28J receives a $\overline{Q}$ output from D-FF 28F. An NANDed output from gate 28J clocks D-FFs 28A to 28F. Q outputs from D-FFs 28A to 28E are inputted to an NOR gate 28G. An NORed output from gate 28G is supplied to a D input of FF 28A. D inputs of FFs 28B to 28F receive Q outputs from FFs 28A to 28E, respectively.

AND gate 28L receives $\overline{Q}$ output from D-FF 28F and NORed output from gate 28G, and provides an ANDed output as the clear pulse CLP (FIG. 5C). Pulse CLP initializes latches 23 and 27 (FIG. 4).

Q outputs from D-FFs 28A to 28E are used as switching pulses SP1 to SP5 (FIGS. 5D, 5F, 5H, 5J and 5L).

Q outputs from D-FFs 28A to 28E are respectively supplied to AND gates 28M to 28R. ANDed outputs from gates 28M to 28R are used as latch pulses LP1 to LP5 (FIGS. 5E, 5G, 5I, 5K and 5M).

Figure 7:
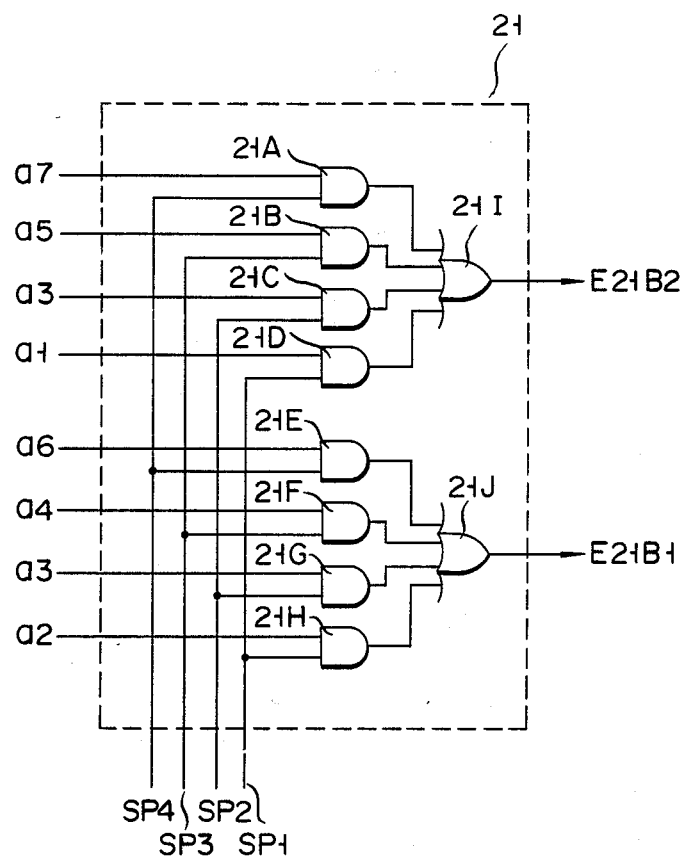
FIG. 7 is a circuit diagram having a switch circuit 21 shown in FIG. 4.

FIG. 7 shows a configuration of switch circuit 21 shown in FIG. 4. Data $a_7$, $a_5$, $a_3$ and $a_1$ are supplied to AND gates 21A, 21B, 21C and 21D, respectively. Gates 21A, 21B, 21C and 21D receive switching pulses SP4, SP3, SP2 and SP1, respectively. ANDed outputs from gates 21A to 21D are supplied to an OR gate 21I. An ORed output from gate 21I is used as said signal E21B2. Data $a_6$, $a_4$, $a_3$ and $a_2$ are supplied to AND gates 21E, 21F, 21G and 21H, and these AND gates receive switching pulses SP4 to SP1. ANDed outputs from gates 21E to 21H are supplied to a OR gate 21J. An ORed output from gate 21J is used as said signal E21B1.

Figure 8:
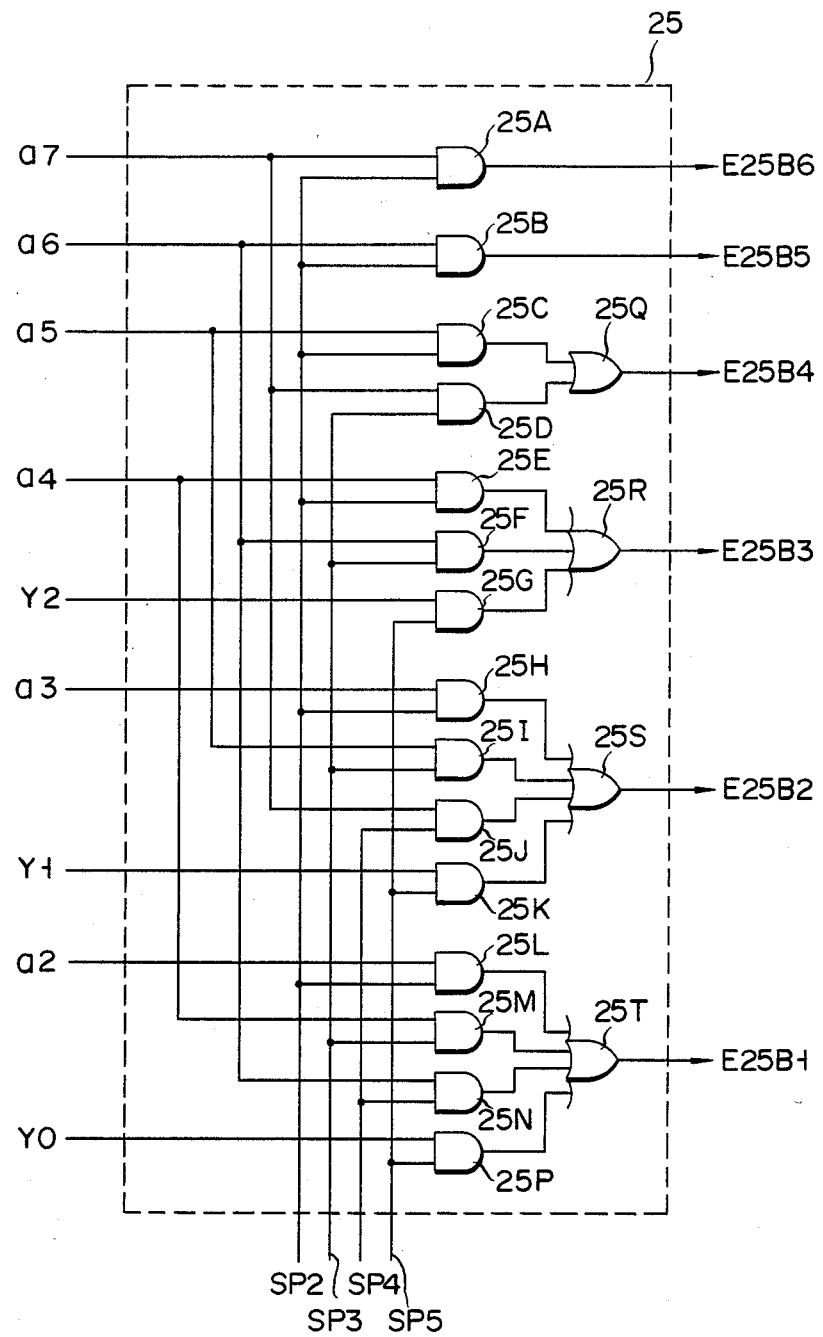
FIG. 8 is a circuit diagram of a switch circuit 25 shown in FIG. 4.

FIG. 8 shows a configuration of switch circuit 25 shown in FIG. 4. Data $a_7$, $a_6$, $a_5$, $a_4$, $Y_2$, $a_3$, $Y_1$, $a_2$ and $Y_0$ are supplied to AND gates 25A, 25B, 25C, 25E, 25G, 25H, 25K, 25L and 25P, respectively. Data $a_7$ is also supplied to AND gates 25D and 25J; data $a_6$, to AND gates 25F and 25N; data $a_5$, to an AND gate 25I; and data $a_4$, to an AND gate 25M. Switching pulse SP2 is supplied to AND gates 25A, 25B, 25C, 25E, 25H and 25L. Switching pulse SP3 is supplied to AND gates 25D, 25F, 25I and 25M. Switching pulse SP4 is supplied to AND gates 25J and 25N. Switching pulse SP5 is supplied to AND gates 25G, 25K, and 25P.

An ANDed output from gate 25A is used as said signal E25B6, and an ANDed output from gate 25B is used as said signal E25B5. ANDed outputs from gates 25C and 25D are converted to said signal E25B4 via an OR gate 25Q. ANDed outputs from gates 25E to 25G are converted to said signal E25B3 via an OR gate 25R. ANDed outputs from gates 25H to 25K are converted to said signal E25B2 via an OR gate 25S. ANDed outputs from gates 25L to 25P are converted to said signal E25B1 via an OR gate 25T.

The same effect as in the first embodiment can be obtained in the second embodiment.

In the above embodiments, a binary number is divided by three. However, the binary number may be divided by seven or fifteen. In general, the present invention is effectively applied to divide a binary number by m (for $m = 2^a - 1$ where a is a positive number of 2 or more). The general infinite series can then be given as follows:

$$L_n/m = \sum_{b=1}^{\infty} L_{(n-ba)} \quad (5)$$

for $L_{(n-ba)} = L_n/2^{ba}$
(where b is a positive integer) where $L_n$ is an n-bit binary number.

For example, when a given binary number, e.g., an 8-bit number, is divided by 3 (i.e., m=3), condition a=2 is given from $m = 2^a - 1$. In this case, an infinite series is given as follows:

$$L_8/3 = \sum_{b=1}^{\infty} L_{(8-2b)}$$

$$= L_6 + L_4 + L_2 + L_0 + \ldots$$

The above infinite series is the same as that described with reference to the first embodiment.

An infinite series is obtained in the following manner when the 8-bit number is divided by seven. In this case, conditions m=7 and a=3 are given from $m = 2^a - 1$.

$$L_8/7 = \sum_{b=1}^{\infty} L_{(8-3b)}$$

$$= L_5 + L_2 + \ldots$$

The above infinite series can be rewritten as follows:

|← integer part →|← decimal part →|

```
L_5: a_7  a_6  a_5  a_4  a_3 . a_2  a_1  a_0  0   0   0   0  ...
L_2: 0    0    0    a_7  a_6 . a_5  a_4  a_3  a_2 a_1 a_0 0  ...
     0    0    0    0    0   . a_7  a_6  a_5  a_4 a_3 a_2 a_1 a_0 ...
     0    0    0    0    0   . 0    0    0    a_7 a_6 a_5 a_4 a_3 ...
```

+)_____

In this case, the sum of the decimal parts can be obtained by repeatedly adding a 3-bit data which is obtained by dividing the decimal part data in a unit of 3-bit from the most significant bit of the decimal part. By using this sum data of the decimal part, a carry to an integer digit position is obtained and is added to the sum of the integer parts.

A detailed description for another case wherein 8-bit data is divided by 15 (i.e., $2^4 - 1$) or by 31 (i.e., $2^5 - 1$) will be omitted. In this case, the decimal point is shifted in a unit of four- or five-bit to the left in the same manner as described above. Decimal parts of decimal point shifted data are added to obtain a carry to an integer digit position. The carry is added to a sum of integer parts. In general, the following relation is given:

$$
\begin{aligned}
1/(2^a - 1) &= 1/2^a\{1 + 1/(2^a - 1)\} \\
&= 1/2^a + (1/2^a)\{(1/(2^a - 1)\} \\
&= 1/2^a + (1/2^a)(1/2^a)\{1 + 1/(2^a - 1)\} \\
&= 1/2^a + 1/2^{2a} + (1/2^{2a})\{1/(2^a - 1)\} \\
&= 1/2^a + 1/2^{2a} + (1/2^{2a})(1/2^a) \times \\
&\qquad \{1 + 1/(2^a - 1)\} \\
&= 1/2^a + 1/2^{2a} + (1/2^{3a}) + (1/2^{3a})\{1/(2^a - 1)\} \\
&= 1/2^a + 1/2^{2a} + 1/2^{3a} + (1/2^{3a})(1/2^a) \times \\
&\qquad \{1 + 1/(2^a - 1)\} \\
&= 1/2^a + 1/2^{2a} + 1/2^{3a} + 1/2^{4a} + \\
&\qquad (1/2^{4a})\{1/(2^a - 1)\} \\
&\quad \vdots \\
&= 1/2^a + 1/2^{2a} + \ldots + 1/2^{ka} + (1/2^{ka}) \times \\
&\qquad \{1/(2^a - 1)\}
\end{aligned}
$$

The above result indicates that $L_n/m$ can be developed into a general infinite series when the divisor m is given as $(2^a - 1)$. For this reason, the present invention can be applied not only to m=3 or 5 but also to $m = 2^a - 1$.

In the above embodiments, the dividend is the 8-bit value $L_8$. However, the number of bits of the dividend is not limited to 8 bits but may be extended to n bits.

As is apparent from the above description, the present invention can be applied whenever an n-bit dividend and a $(2^a - 1)$ divisor are given.

What is claimed is:

1. A divider circuit for dividing n-bit binary data $L_n$ by a number m which is defined as $m = 2^a - 1$ where a is a positive integer of 2 or greater, the division operation $L_n/m$ being developed into an infinite series given as:

$$L_n/m = \sum_{b=1}^{\infty} L_{(n-ba)}$$

for $L_{(n-ba)} = L_n/2^{ba}$ (where b is a positive integer), said divider circuit comprising:

first means, responsive to said binary data $L_n$, for sectioning a decimal part of a plurality of most significant terms of said infinite series from an integer part of said most significant terms, each said decimal part sectioned into a unit of a-bits from the most significant bits of the decimal part where a is said positive integer $\geq 2$, and for summing said sectioned decimal part units of said plurality of terms of said infinite series to generate a summed decimal part;

second means coupled to said first means, for discriminating an integer part carry from said summed decimal part to be added to the integer part of said binary data $L_n$; and third means coupled to said second means and responsive to said binary data $L_n$, for summing sections of integer parts of said binary data $L_n$, thereby producing a sum of integer parts, and for adding said integer part carry produced by said second means to said sum of integer parts to thereby provide a divided data result corresponding to $L_n/m$.

2. A divider according to claim 1, wherein said first means includes:

first adder means responsive to a first given part of said binary data $L_n$, for summing the contents of said first given part for each a-bit unit included therein to produce a first carry and a first summed result;

second adder means responsive to a second given part of said binary data $L_n$, for summing the contents of said second given part for each a-bit unit included therein to produce a second carry and a second summed result; and third adder means coupled to said first and second adder means, for adding said first carry and first summed result to said second carry and second summed result, and generating said summed decimal part.

3. A divider according to claim 2, wherein said first adder means includes an a-bit full adder, said second adder means includes an a-bit full adder, and said third adder means includes an (a+1)-bit full adder.

4. A divider according to claim 2, wherein said third means includes:

fourth adder means responsive to a third given part of said binary data $L_n$, for adding the contents of said third given part to said integer part carry, to produce a third carry and a third summed results; and fifth adder means coupled to said fourth adder means and responsive to a fourth given part of said binary data $L_n$, for summing the contents of said fourth given part to produce summed data, and for adding said third carry and said third summed result to said summed data to produce said divided data result.

5. A divider according to claim 4, wherein said fourth adder means includes an (a+1)-bit full adder.

6. A divider according to claim 1, wherein said first means includes:

generator means for generating first switching pulses said first latch pulses, said first switching pulses being in synchronism with said first latch pulses;

first switch means responsive to said first switching pulses, for sequentially selecting a-bit data from said binary data $L_n$ in accordance with said first switching pulses; and first accumulator means coupled to said first switch means and being responsive to said first latch pulses, for sequentially accumulating said a-bit data in accordance with said first latch pulses, and providing said summed decimal part.

7. A divider according to claim 6, wherein said generator means further includes means for generating second switching pulses and for generating second latch pulses in synchronism with the generation of said second switching pulses, and wherein said third means includes:

second switch means coupled to said second means and responsive to a prescribed part of said binary data $L_n$ and to said second switch pulses, for selecting specific data from said binary data $L_n$ and said carry in accordance with said second switching pulses; and second accumulator means coupled to said second switch means and being responsive to said specific data and to said second latch pulses, for accumulating said specific data in accordance with said second latch pulses, and thereby providing said divided data result.

8. A divider according to claim 1, wherein, when m=3, said second means performs a carry discrimination in accordance with the below logical relations:

$$Y_2 = X_3 \cdot X_2$$

$$Y_1 = X_3 \cdot \overline{X}_2 + X_2 \cdot X_1$$

-continued
$$Y_0 = X_3 \cdot \overline{X}_2 \cdot X_1 + \overline{X}_3 \cdot X_2 \cdot \overline{X}_1 + \overline{X}_2 \cdot X_1 \cdot X_0 + X_3 \cdot \overline{X}_2 \cdot X_0$$

where $Y_2$, $Y_1$ and $Y_0$ are used as said carry, $X_3$, $X_2$, $X_1$ and $X_0$ are used as said summed decimal parts, and $\overline{X}_3$, $\overline{X}_2$, $\overline{X}_1$ respectively correspond to inversions of $X_3$, $X_2$, $X_1$.

* * * * *